(12) United States Patent
Vorontcov et al.

(10) Patent No.: US 9,674,308 B2
(45) Date of Patent: Jun. 6, 2017

(54) MANAGING SEARCH SESSION DATA (71) Applicant: YANDEX EUROPE AG, Lucerne (CH)

(72) Inventors: Iurii Vitalievich Vorontcov, Saint-Petersburg (RU); Aleh Viktorovich Liauchuk, Minsk (BY); Mikhail Aleksandrovich Karpov, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/725,113

(22) Filed: May 29, 2015

(65) Prior Publication Data

US 2015/0264160 A1    Sep. 17, 2015

Related U.S. Application Data

(63) Continuation of application No. PCT/IB2014/062867, filed on Jul. 4, 2014.

(30) Foreign Application Priority Data

Dec. 31, 2013    (RU) .............................. 2013158995

(51) Int. Cl.
*G06F 15/16* (2006.01)
*H04L 29/06* (2006.01)
(Continued)

(52) U.S. Cl.
CPC ........ *H04L 67/42* (2013.01); *G06F 17/30873* (2013.01); *H04L 9/32* (2013.01); *H04L 67/02* (2013.01); *H04L 67/306* (2013.01)

(58) Field of Classification Search
CPC ....... H04L 67/42; H04L 67/02; H04L 67/306; H04L 9/32; H04L 29/06; H04L 29/08; G06F 17/30873
See application file for complete search history.

(56) References Cited

U.S. PATENT DOCUMENTS 7,827,170 B1 * 11/2010 Horling ............... G06F 17/3053
                                                            707/722
8,051,143 B2    11/2011 Pallamreddy et al.
(Continued)

FOREIGN PATENT DOCUMENTS

RU            2432608 C2    10/2011
WO       2011146224 A1    11/2011

OTHER PUBLICATIONS

Supplementary European Search Report for 14875936, Cankaya, Sukru, Jan. 12, 2016.

(Continued)

*Primary Examiner* — Cheikh Ndiaye
(74) *Attorney, Agent, or Firm* — BCF LLP (57) ABSTRACT

There is provided a method of synchronizing a first browsing session and a second browsing session for a user, the first browsing session having been executed on a first electronic device. The method comprises receiving, by a server via a communication network, a request for the second browsing session from one of the first electronic device and a second electronic device at a point of time after initiation of the first browsing session; responsive to the user being a subscriber of a synchronization feature, causing by the server via the communication network the second browsing session to be displayed on the one of the first electronic device and the second electronic device, the second browsing session including a server-side history associated with user interactions within the first browsing session performed prior to said receiving.

24 Claims, 7 Drawing Sheets

(51) Int. Cl.
*H04L 9/32* (2006.01)
*H04L 29/08* (2006.01)
*G06F 17/30* (2006.01)

(56) References Cited

U.S. PATENT DOCUMENTS

| | | | |
|---|---|---|---|
| 8,225,191 | B1 | 7/2012 | Kalman et al. |
| 8,392,617 | B1* | 3/2013 | Weber ............... G06F 17/30873 |
| | | | 709/203 |
| 8,775,682 | B1* | 7/2014 | Mathias ............ G06F 17/30578 |
| | | | 709/248 |
| 2003/0084165 | A1 | 5/2003 | Kjellberg et al. |
| 2003/0105819 | A1 | 6/2003 | Kim et al. |
| 2003/0110266 | A1* | 6/2003 | Rollins ................... H04L 29/06 |
| | | | 709/227 |
| 2005/0138122 | A1 | 6/2005 | Boehringer et al. |
| 2008/0168185 | A1 | 7/2008 | Robbin et al. |
| 2008/0301222 | A1* | 12/2008 | Schneider ......... G06F 17/30884 |
| | | | 709/203 |
| 2009/0144451 | A1* | 6/2009 | Cabezas ............ G06F 17/30884 |
| | | | 709/248 |
| 2010/0174774 | A1* | 7/2010 | Kern ....................... H04L 29/06 |
| | | | 709/203 |
| 2011/0078332 | A1 | 3/2011 | Poon |
| 2011/0289156 | A1* | 11/2011 | Pirnazar ............ G06F 17/30873 |
| | | | 709/206 |
| 2013/0073738 | A1 | 3/2013 | Resiman |
| 2013/0097239 | A1 | 4/2013 | Brown et al. |
| 2013/0254685 | A1* | 9/2013 | Batraski ............ G06F 17/30876 |
| | | | 715/760 |

OTHER PUBLICATIONS

International Search Report of PCT/IB2014/062867; Oct. 8, 2014; Shane Thomas.

* cited by examiner

FIG. 7 ription>
MANAGING SEARCH SESSION DATA

CROSS-REFERENCE

The present application claims convention priority to Russian Utility Patent Application No. 2013158995, filed on Dec. 31, 2013, entitled "СПОСОБ СИНХРОНИЗАЦИИ ПЕРВОЙ И ВТОРОЙ СЕССИИ ПРОСМОТРА СТРАНИЦ ДЛЯ ПОЛЬЗОВАТЕЛЯ И СЕРВЕР ". This application is incorporated by reference herein in its entirety. The present application is a continuation of International Patent Application no. PCT/IB2014/062867, filed on Jul. 4, 2014, entitled "MANAGING SEARCH SESSION DATA", the entirety of which is incorporated herein by reference.

FIELD

The present technology relates to search engines in general and specifically to a system and method for managing search session data.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communications network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

For example, the given user may be interested in viewing pictures of Britney Spears, but may not be aware of a particular resource that would present such information. Alternatively, the given user may be interested in locating the closest Starbucks coffee shop, but again may not be aware of a particular web resource to provide such location services. In these fictitious (yet practical) circumstances, the given user may run a web search using a search engine.

A typical user these days has access to a multitude of electronic devices. Or example, a user may have a personal laptop, a work laptop, a wireless electronic device (such as an iPhone or a Blackberry™ smartphone) or even several wireless electronic devices (such as a Blackberry smartphone for work and iPhone smartphone for personal use or vice versa). With this proliferation of electronic devices associated with he given user, he given user gets greater flexibility as to how to access resources over networks, be it at home, at the office or on the go. At the same time, it is possible that the given user may start a particular communication session on one electronic device and may be desirous of continuing the commutation session on a different electronic device.

U.S. Pat. No. 8,392,617 teaches techniques for state information sharing. At least one of user information and browser information is stored in a first configuration file in a first file format associated with a first browser application. A change in at least one of the user information and the browser information in the first configuration file is recognized. The changed at least one of the user information and the browser information in the first file format is converted to a second file format associated with a second browser application. A second configuration file is updated with the changed at least one of the user information and the browser information in the second file format. In response to starting the second browser application, a user and browser state is set using the user information and the browser information in the second configuration file.

SUMMARY

It is an object of the present technology to ameliorate at least some of the inconveniences present in the prior art.

According to a first broad aspect of the present technology, there is provided a method of synchronizing a first browsing session and a second browsing session for a user, the first browsing session having been executed on a first electronic device. The method comprises receiving, by a server via a communication network, a request for the second browsing session from one of the first electronic device and a second electronic device at a point of time after initiation of the first browsing session; responsive to the user being a subscriber of a synchronization feature, causing by the server via the communication network the second browsing session to be displayed on the one of the first electronic device and the second electronic device, the second browsing session including a server-side history associated with user interactions within the first browsing session performed prior to the receiving.

In some aspects of the method, the first electronic device and the second electronic device are the same electronic device.

In some aspects of the method, the first browsing session and the second browsing session are respective search engine search sessions.

In some aspects of the method, the server-side history includes searches executed by the user within the first browsing session.

In some aspects of the method, the server-side history includes an indication of which search results within the search engine search session were selected by the user within the first browsing session.

In some aspects of the method, wherein the server-side history includes an indication of user navigating between various web resources within the first browsing session.

In some aspects of the method, the server-side history includes an indication of user behaviour within a given one of web resources browsed as part of the first browsing session.

In some aspects of the method, the method further comprises retrieving the server-side history associated with the user interactions within the first browsing session.

In some aspects of the method, the method further comprises during the first browsing session, appreciating and storing an indication of the user interactions within the first browsing session in a memory.

In some aspects of the method, the appreciating comprises intercepting control messages exchanged between the first electronic device and the server.

In some aspects of the method, storing comprises storing the indication of the user interactions in the memory in association with a user profile associated with the user.

In some aspects of the method, the method further comprises retaining the indication of the user interactions in the memory for a period of time.

In some aspects of the method, the method further comprises checking if the user is a subscriber to the synchronization function. The checking may comprise accessing a memory and determining if a flag indicative of the user being the subscriber has been stored.

According to another broad aspect of the present technology, there is provided a server comprising a communication interface structured and configured to communicate with a communications network and at least one computer processor operationally connected with the communication interface and structured and configured to: receive, via the communication interface, a request for a second browsing session from one of a first electronic device and a second electronic device at a point of time after initiation of a first browsing session, the first browsing session having been executed on the first electronic device; responsive to the user being a subscriber of a synchronization feature, cause, via the communication interface, the second browsing session to be displayed on the one of the first electronic device and the second electronic device, the second browsing session including a server-side history associated with user interactions within the first browsing session performed prior to the receiving.

In some aspects of the server, the first electronic device and the second electronic device are the same electronic device.

In some aspects of the server, the first browsing session and the second browsing session are respective search engine search sessions.

In some aspects of the server, the server-side history includes searches executed by the user within the first browsing session.

In some aspects of the server, the server-side history includes an indication of which search results within the search engine search session were selected by the user within the first browsing session.

In some aspects of the server, the server-side history includes an indication of user navigating between various web resources within the first browsing session.

In some aspects of the server, the server-side history includes an indication of user behaviour within a given one of web resources browsed as part of the first browsing session.

In some aspects of the server, the server is further configured to retrieve the server-side history associated with the user interactions within the first browsing session.

In some aspects of the server, the server is further configured during the first browsing session, to appreciate and store an indication of the user interactions within the first browsing session in a memory.

In some aspects of the server, the server is further configured, to appreciate the servers-side history, to intercept control messages exchanged between the first electronic device and the server.

In some aspects of the server, the server is further configured, to store the indication of the user interactions, to store the indication of the user interactions in the memory in association with a user profile associated with the user.

In some aspects of the server, the server is further configured to retain the indication of the user interactions in the memory for a period of time.

In some aspects of the server, the server is further configured to check if the user is a subscriber to the synchronization function.

In some aspects of the server, the server is further configured, to check if the user is a subscriber, to access a memory and determining if a flag indicative of the user being the subscriber has been stored.

In some aspects of the server, the server being implemented as a search engine server.

In some aspects of the server, the server being implemented as a server-session-storage module being in communication with a search engine server via the communication interface.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
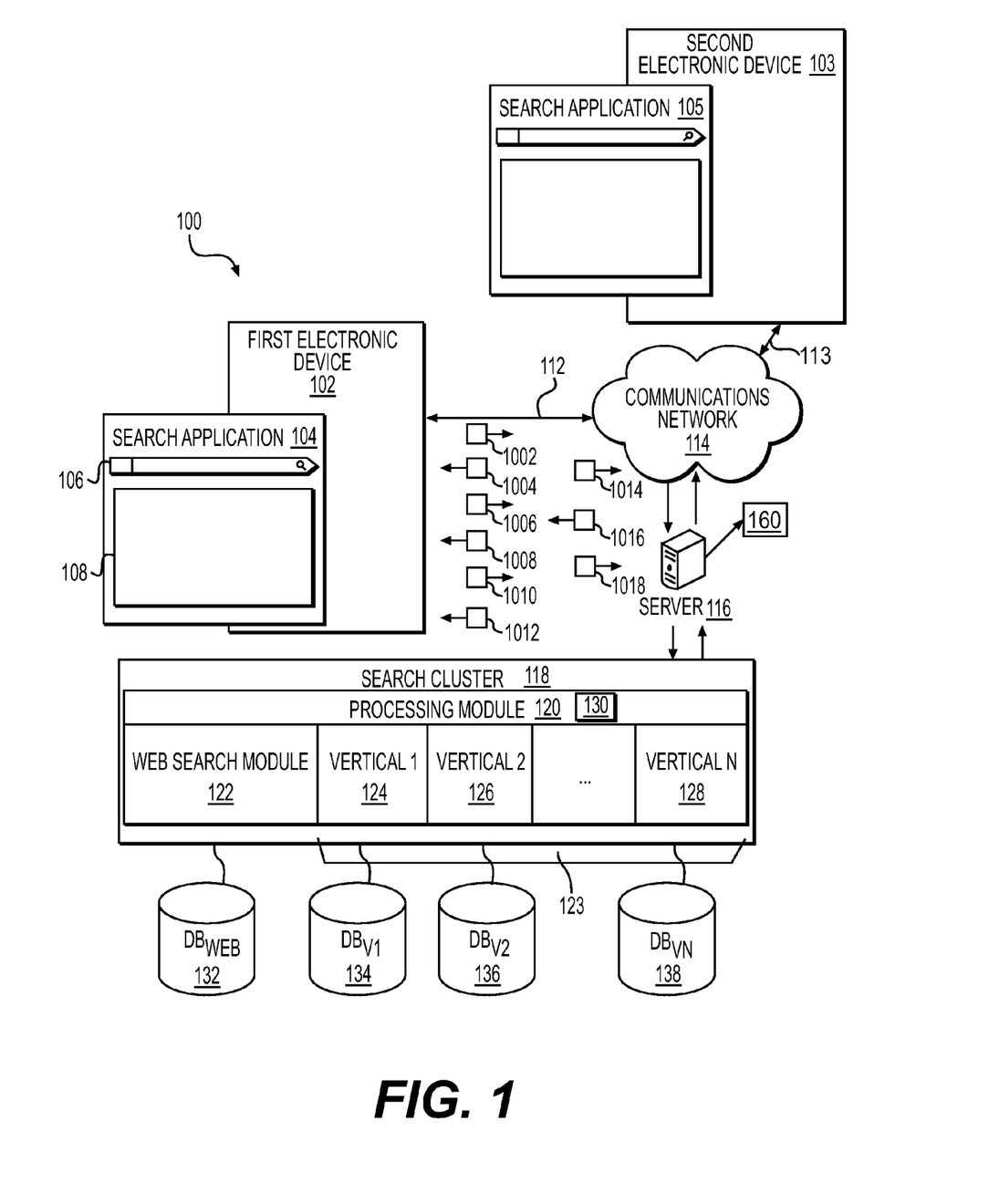
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a first electronic device 102. The first electronic device 102 is typically associated with a user (not depicted) and, as such, can sometimes be referred to as a "client device". It should be noted that the fact that the first electronic device 102 is associated with the user does not need to suggest or imply any mode of operation—such as a need to log in, a need to be registered or the like.

The implementation of the first electronic device 102 is not particularly limited, but as an example, the first electronic device 102 may be implemented as a personal computer (desktops, laptops, netbooks, etc.), a wireless electronic device (a cell phone, a smartphone, a tablet and the like), as well as network equipment (a router, a switch, or a gateway). The first electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

The system 100 further comprises a second electronic device 103. The second electronic device 103 is also associated with the user. It should be noted that the fact that the second electronic device 103 is associated with the user does not need to suggest or imply any mode of operation—such as a need to log in, a need to be registered or the like.

The implementation of the second electronic device 103 is not particularly limited, but as an example, the second electronic device 103 may be implemented as another one of a personal computer (desktops, laptops, netbooks, etc.), a wireless electronic device (a cell phone, a smartphone, a tablet and the like), as well as network equipment (a router, a switch, or a gateway). The second electronic device 103 comprises hardware and/or software and/or firmware (or a combination thereof), as is known in the art, to execute the search application 104.

It is noted that the first electronic device 102 and the second electronic device 103 can be implemented in the same form factor. Alternatively, the first electronic device 102 and the second electronic device 103 can be implemented in different form factors. Merely for illustration purposes, it will be assumed that the first electronic device 102 is implemented as a lap top and the second electronic device 103 is implemented as a wireless electronic device. It should be understood that the first electronic device 102 and the second electronic device 103 can be implemented in any other manner without affecting implementations of the present technology.

How the search application 104 is implemented is not particularly limited. One example of the search application 104 may be embodied in a user accessing a web site associated with a search engine to access the search application 104. For example, the search application can be accessed by typing in an URL associated with Yandex search engine at www.yandex.ru. It should be expressly understood that the search application 104 can be accessed using any other commercially available or proprietary search engine. It is also noted that the search application 104 executed on the first electronic device 102 does not have to be (but can be) the same the search application 104 executed on the second electronic device 103. For example, the first electronic device 102 (being, as an example, lap top) can implement the search application 104 as a browser accessing the search engine web site and the second electronic device 103 (being, as an example, wireless electronic device) can implement the search application 104 as a browser application.

In alternative non-limiting embodiments of the present technology, the search application 104 may be implemented as a browser application on a portable device (such as a wireless electronic device). For example (but not limited) to those implementations, where the second electronic device 103 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally, speaking, the search application 104 comprises a query interface 106 and a search result interface 108. The general purpose of the query interface 106 is to enable the user (not depicted) to enter her query or a "search string". The general purpose of the search result interface 108 is to provide search results that are responsive to the user query entered into the query interface 106. How the user query is processed and how the search results are presented will be described in detail herein below.

The first electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the first electronic device 102 is implemented. Recalling that the first electronic device 102 is implemented, in this example, as a laptop, the communication link 112 can be either wireless (such as the Wireless Fidelity, or WiFi® for short, Bluetooth® or the like) or wired (such as an Ethernet based connection).

The second electronic device 103 is also coupled to the communications network 114 via a communication link 113. In some embodiments of the present technology, the communication link 113 can be implemented in the same way as the communication link 112. Alternatively, the communication link 113 and the communication link 112 can be implemented differently.

Recalling that the second electronic device 103 is implemented, in this example, as a wireless electronic device, the communicated link 113 can be implemented as a wireless communication link (such as but not limited to, a 3G communications network link, a 4G communications network link, a Wireless Fidelity, or WiFi® for short, Bluetooth® and the like).

It should be expressly understood that implementations for the first electronic device 102, the second electronic device 103, the communication link 112, the communication link 113 and the communications network 114 are provided for illustration purposes only. As such, those skilled in the art will easily appreciate other specific implementational details for the first electronic device 102, the second electronic device 103, the communication link 112, the communication link 113 and the communications network 114. As such, by no means, examples provided herein above are meant to limit the scope of the present technology.

Also coupled to the communications network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

The implementation of the server 116 is well known. However, briefly speaking, the server 116 comprises a communication interface (not depicted) structured and configured to communicate with various entities via the communications network 114. The server 116 further comprises at least one computer processor (not depicted) operationally connected with the communication interface and structured and configured to execute various process to be described herein.

The server 116 is communicatively coupled (or otherwise has access) to a search cluster 118. The general purpose of the search cluster 118 is to perform searches in response to the user queries inputted via the query interface 106 and to output search results to be presented to the user using the search results interface 108. What follows is a description of one non-limiting embodiment of the implementation for the search cluster 118. However, it should be understood that there is a number of alternative non-limiting implementations of the search cluster 118 possible. It should be also expressly understood that in order to simplify the description presented herein below, the configuration of the search cluster 118 has been greatly simplified. It is believed that those skilled in the art will be able to appreciate implementational details for the search cluster 118 and for components thereof that may have been omitted for the purposes of simplification of the description.

Generally speaking the purpose of the search cluster 118 is to (i) conduct searches (details will be explained herein below); (ii) execute analysis of search results and perform ranking of search results; (iii) group results and compile the search result page (SERP) to be outputted to the first electronic device 102. How the search cluster 118 is configured to execute searches is not particularly limited. Those skilled in the art will appreciate several ways and means to execute the search using the search cluster 118 and as such, several structural components of the search cluster 118 will only be described at a high level.

In some non-limiting embodiments of the present technology, the search cluster 118 comprises a processing module 120. The processing module 120 can execute several searches, including but not limited to, a general search and a vertical search. To that end, the processing module 120 comprises (or has access to) a web search module 122. The web search module 122 is configured to perform general web searches, as is known to those of skill in the art.

In some non-limiting embodiments of the present technology, processing module 120 can execute what is known as a multi-level search. These non-limiting embodiments can be implemented, for example, to increase the speed of the search and to obtain more relevant search results. In some non-limiting embodiments of the present technology, the web search module 122 can be responsible for executing the multi-level search.

To that end, the web search module 122 can execute the top level meta search, as will be discussed in greater detail herein below. The web search module 122 may also have access to a database $DB_{WEB}$ 132, which database $DB_{WEB}$ 132 may be accessed by the web search module 122 to conduct a middle level meta search and a bottom level search. Even though the database $DB_{WEB}$ 132 is depicted as a single entity, in some non-limiting embodiments of the present technology, the database $DB_{WEB}$ 132 can be implemented in a distributed manner, for example as a dedicated database for each of the middle level meta search and the bottom level search.

Also, even though the web search module 122 is depicted as a single entity, in alternative non-limiting embodiments of the present technology the web search module 122 may also be implemented in a distributed manner. For example, each of the distributed implementations of the web search modules 122 may be dedicated to search queries originating from a particular geographical region. In those non-limiting embodiments of the present technology, the processing module 120 may determine a location and/or an IP address associated with the first electronic device 102 associated with the user who is submitting the search query. Based on the so-determined location and/or the IP address of the first electronic device 102, the processing module 120 may forward the search query to one of the distributed web search modules 122 to perform the top level meta search.

The web search module 122 may also forward a request to the database $DB_{WEB}$ 132 to perform the middle level meta search and the bottom level search. In some non-limiting embodiments of the present technology, the database $DB_{WEB}$ 132 may have a portion (or a separate database) dedicated to the middle level meta search (for example, having a repository of frequently asked questions). The identification of the portion (or a separate database) of the database $DB_{WEB}$ 132 responsible for the middle level meta search may be executed by the database $DB_{WEB}$ 132 based on a so-called "CRC-code". The portion (or a separate database) of the database $DB_{WEB}$ 132 responsible for the middle level meta search may send a given generated query to a portion (or a separate database) of the database $DB_{WEB}$ 132 responsible for the bottom level search.

However, in some non-limiting embodiments of the present technology, where the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level search may be omitted altogether. Naturally, in alternative embodiments of the present technology, even if the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level search may still be performed.

The processing module 120 further comprises (or has access to) a plurality of vertical search modules 123. In the depicted non-limiting embodiment, the plurality of vertical search modules includes a vertical 1 module 124, a vertical 2 module 126 and a vertical N module 128. It should be expressly understood that the number of modules within the plurality of vertical search modules 123 is not meant to be a limitation of embodiments of the present technology.

Merely for the purposes of ease of illustration, it shall be assumed that the vertical 1 module 124 is implemented as a vertical search domain for searching maps and other geographical information. As such, it can be said that the vertical 1 module 124 implements a map vertical search engine or, simply, a map service.

Furthermore, it shall be assumed that the vertical 2 module 126 is implemented as a vertical search module for searching images. As such, it can be said that the vertical 2 module 126 implements an images vertical search domain or, simply, an image service. For the various examples to be provided herein below, it shall be assumed, selectively, that the vertical N search module 128 can implement one of sports news, movies, weather, translation, wiki or movie theater services. It should be expressly understood that a number of additional or different services can be implemented as part of the plurality of vertical search modules 123.

In some non-limiting embodiments of the present technology, any given one of the plurality of vertical search modules 123 comprises or has access to one or more databases. These one or more databases host data associated with the particular service implemented by the given one of the plurality of vertical search modules 123.

To that extent, the vertical 1 module 124 has access to a database $DB_{V1}$ 134. Recalling that the vertical 1 module 124 implements a map service, the database $DB_{V1}$ 134 contains information related to geographical location of various objects and the associated maps. The vertical 2 module 126 has access to a database $DB_{V2}$ 136. Recalling that the vertical 2 module 126 implements an image service, the database $DB_{V2}$ 136 can host a repository of various images. By the same token, the vertical N module 128 has access to a database $DB_{VN}$ 138. Recalling that the vertical N module 128 implements selectively one of sports news, movies, weather, translation or movie theater services, the database $DB_{VN}$ 138 can host a repository of data associated with the respective selective service.

Additionally or optionally and, as known to those skilled in the art, the one or more databases (such as the database $DB_{V1}$ 134, $DB_{V2}$ 136 and $DB_{VN}$ 138) may be segregated into one or more separate databases. These segregated databases may be portions of the same physical database (such as the database $DB_{V1}$ 134, database $DB_{V2}$ 136 and database $DB_{VN}$ 138) or may be implemented as separate physical entities. For example, one database within, let's say, the database $DB_{V2}$ 136 could host the most popular/most frequently requested images in a given category, while another database within the database $DB_{V2}$ 136 could host all the images available within the image service. Needless to say, the above has been provided as an illustration only and several additional possibilities exist for implementing embodiments of the present technology.

Furthermore, it is possible that some of the plurality of vertical search modules 123 may not implement a separate database. This is particularly true, but is not limited to, for example, the vertical N module 128 implementing a weather service. In this example, the vertical N module 128 implementing the weather service may not have a dedicated database, but may rather have access to a service widget repository 130. The service widget repository 130 may be implemented as data repository for one or more widget applications, as will be described in greater detail here below.

Each of the plurality of vertical search modules 123 is configured to perform vertical searches within the respective databases (i.e. database $DB_{V1}$ 134, database $DB_{V2}$ 136 and database $DB_{VN}$ 138). However, it should be noted that the search capabilities of the plurality of vertical search modules 123 are not limited to searching the respective databases (i.e. database $DB_{V1}$ 134, database $DB_{V2}$ 136 and database $DB_{VN}$ 138). As such, the plurality of vertical search modules 123 may perform other searches, as the need may be.

Also, for the purposes of the description presented herein, the term "vertical" (as in vertical search or in vertical search domain) is meant to connote a search performed on a subset of a larger set of data, the subset having been grouped pursuant to an attribute of data. For example, to the extent that the vertical 2 module 126 implements an image service, the vertical 2 module 126 searches a subset (i.e. images) of the set of data (i.e. all the data potentially available for searching), the subset of data being stored in the database $DB_{V2}$ 136.

In some non-limiting embodiments of the present technology, some or all of the search results returned by a respective one of the vertical search modules 123 can be formatted into a widget application. In a sense, the widget application is a particular way to represent the search results from a given vertical search of one of the plurality of vertical search modules 123.

Merely for the purposes of simplifying the description to be presented herein, only a high level description of one approach to executing a search by the search cluster 118 will be presented herein below. It is expected that those skilled in the art will be able to configure the search cluster 118 in any number of known ways without undue experimentation or burden.

As has been mentioned above, in some non-limiting embodiments of the present technology, the processing module 120 can be configured to execute a search in a multi-level meta fashion. In some non-limiting embodiments of the present technology, the processing module 120 includes an http-interface (not depicted) for receiving the search request from the server 116.

When the processing module 120 receives the search query from the server 116, it sends the search query to the web search module 122. As has been alluded to above, in some non-limiting embodiments of the present technology, the sending of the search request to the web search module 122 may be based on the location and/or IP address associated with the first electronic device 102, as may be determined by the processing module 120. The web search module 122 performs a search, which in some non-limiting embodiments of the present technology may include a multi-level search. To that extent, the web search module 122 executes some or all of the top level meta search, middle level middle search and the bottom level search.

In parallel or in sequence, the processing module 120 also transmits the search query to the plurality of vertical search modules 123 for performing the respective vertical searches. The responses from all the search sources (the plurality of vertical search modules 123 and the web search module 122, which may include the bottom level search, the middle level meta search and the top level meta search) are received and amalgamated by the processing module 120.

The processing module 120 then executes a ranking function to generate a ranked search results set. In other words, the processing module 120 ranks the search results by their relevancy to the search query submitted by the user. As those skilled in the art will appreciate, relevancy within this description shall mean how responsive a given search result is to the user query.

Those skilled in the art will appreciate various techniques available for ranking search results. Just as an example and not as a limitation, some of the known techniques for ranking search results by relevancy are based on some or all of: (i) how popular a given search query or a response thereto is in either the plurality of vertical search modules 123 or in the bottom level search (or any other level of the multi level meta search); (ii) how many results have been returned by either the plurality of vertical search modules 123 or in the bottom level search (or any other level of the multi level meta search); (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the standard SERP.

Within this description, the term "determinative term" shall mean a word or a string of words indicative of the fact that a given search result is more likely to have the most relevant response to the user search query. For example, if the search query contains the term "images" it can be determined, by the processing unit 120, that the vertical 2 module 126, being implemented as an image service, is likely to be the service that contains the most relevant results to the user query. Needless to say, only a sub set of these, or these combined to others or any combination of other factors my be taken into account when ranking the search results for relevancy.

According to embodiments of the present technology, the server 116 comprises a server-session-storage module 160. In alternative embodiments of the present technology, the server-session-storage module 160 can be executed on a separate server (not depicted). In yet further alternative embodiments of the present technology, the server-session-storage module 160 can be executed in a distributed manner between the server 116 and/or other servers (not depicted) potentially present within the architecture of the system 100. It should be also understood that at least a portion of the functionality of the server-session-storage module 160 can be executed on one or the other or both of the first electronic device 102 and the second electronic device 103.

In order to illustrate the various embodiments of the present technology, the following example scenario shall be used. It shall be assumed that the user accesses the search application 104 using the first electronic device 102. For the purposes of the illustration, it shall be assumed that the first electronic device 102 is a Lenovo™ X220 laptop, the search application 104 is a Yandex™ browser.

For the purposes of the illustration, reference will be made to FIG. 2, which depicts a screen shot of a non-limiting embodiment of the search application 104 prior to user inputting any search queries. As has been previously described, the search application 104 has the query interface 106 and the search results interface 108, both of which are empty as the user has not yet started inputting any search queries. Within the illustration of FIG. 2, the query interface 106 is implemented as an "omnibox" field—the one incorporating functionality of the query interface 106 and a browser command line (in other words, the user can use the omnibox for both entering search queries and URLs).

The search application 104 also comprises a control panel 210, the control panel having shortcuts and/or notifications from a number of services. Within the specific example, the services include Yandex™ weather, Gmail™, United States Patent and Trademarks Office, Java™ software download website, news portal www.lenta.ru, YourTube™, news portal rus.delfi.lv. Within the specific example, the content of the control panel is generated by the search application 104 based on the recently visited web resources and/or services to which the user is logged into (or otherwise is authenticated with). It should be noted that the control panel 210 can be generated in any other manner, can be customized by he user or can be omitted altogether without affecting the scope of implementations of the embodiments of the present technology.

Figure 2:
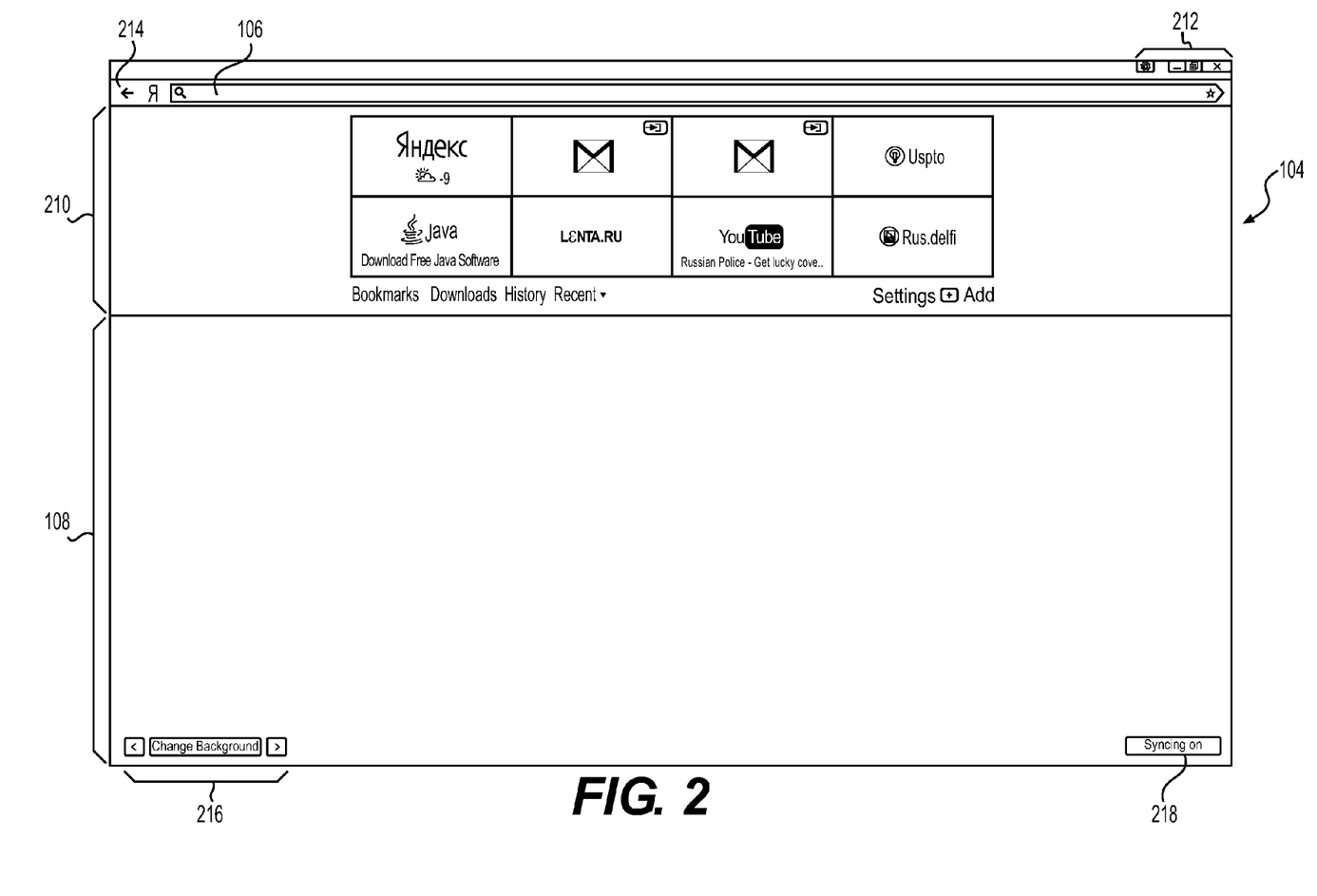
FIG. 2 depicts a screen shot of a non-limiting embodiment of the search application 104 of FIG. 1, prior to user inputting any search queries.

Briefly to complete the description of the search application 104 of FIG. 2, the search application 104 comprises a browser control buttons panel 212. The browser control buttons panel 212 includes the well-known button for minimizing the browser screen, maximizing the browser screen and closing the browser screen (all not numbered). The browser control buttons panel 212 can also include a setting button for affecting user-selectable changes to the control panel 210.

The search application 104 also includes a conventionally-known back button 214, the back button 214 for allowing the user to go back to previously viewed web resources. The search application 104 further includes a background control field 216, the background control field 216 for controlling a background graphic of the search results interface 108. Finally, the search application 104 comprises a synchronization control button 218. The synchronization control button 218 allows to turn the server-side history synchronization on or off, as will be described in greater detail herein below. It should be expressly noted that the various details of the implementation of the search application 104 can be varied or omitted without affecting the scope of implementation of the embodiments of the present technology.

Figure 3:
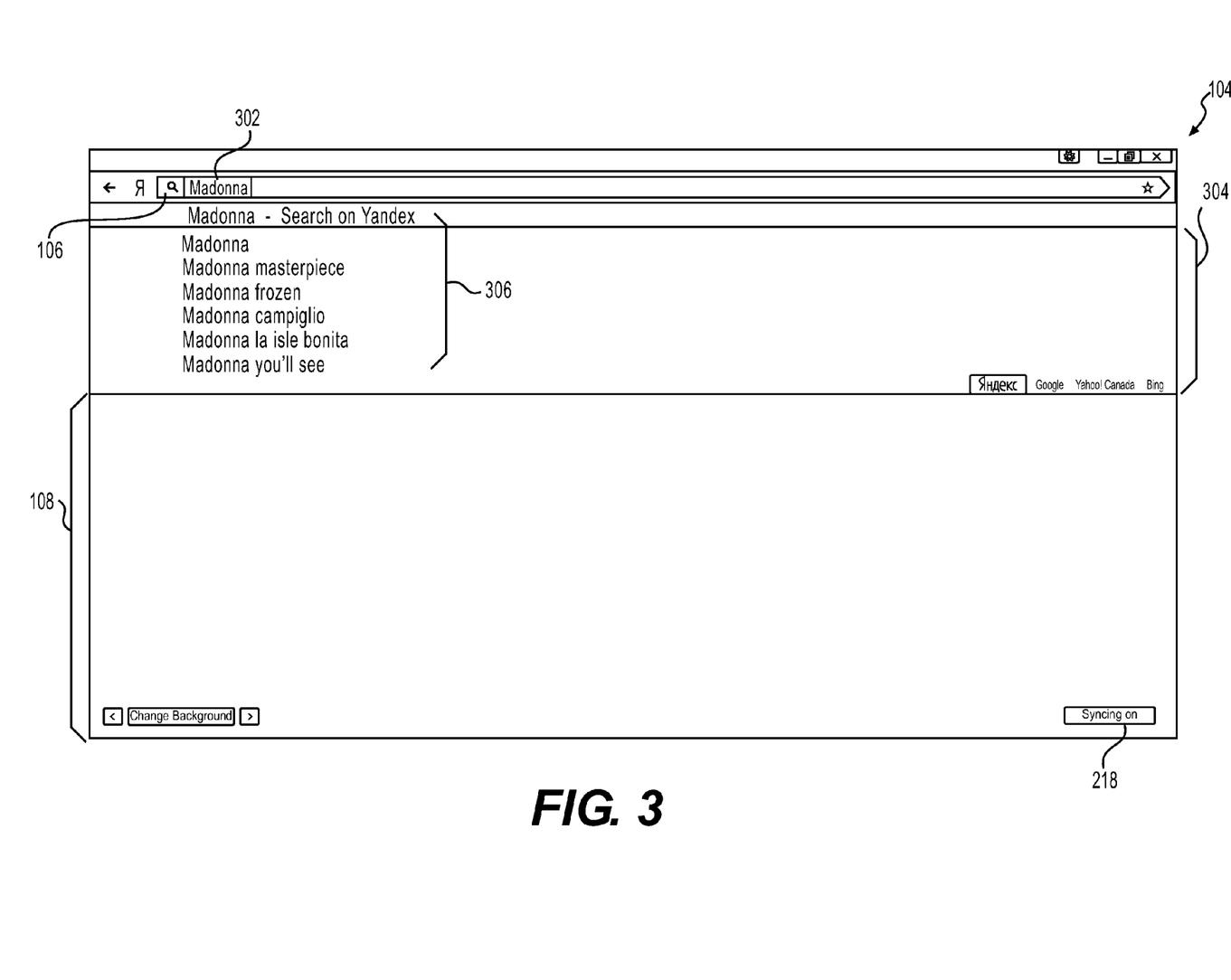
FIG. 3 depicts a non-limiting embodiment of the search application 104 of FIG. 2, whereby the user has started entering a search query into a query interface 106 and the search application displaying a list of suggests to the user.

With reference to FIG. 3, there is depicted the search application 104 of FIG. 2, whereby the user has started entering a search query "Madonna" into the query interface 106. Upon the user entering the search query (or at least a portion thereof), the search application transmits to the server 116 via the communications network 114, a control message 1002 (all control messages to be described herein are schematically depicted with reference to FIG. 1), the control message 1002 containing the search query (or at least the portion thereof, as the case may be).

In response to the receipt of the control message 1002, the server 116 generates a list of suggests and transmits to the first electronic device 102 a control message 1004 containing the list of suggests. It is generally known in the art how the server 116 can generate the list of suggests and, as such, it will not be described here at any length.

With reference to FIG. 3, the query interface 106 has been populated with a query term 302, which in this examples happens to contain "Madonna". This indication of the query term 302 is what is transmitted to the server 116 as part of the control message 1002.

Upon the receipt of the control message 1004, the first electronic device 102 is configured to generate a suggest drop down menu 304, the suggest drop down menu 304 containing one or more suggests 306, the one or more suggests 306 having been generated based at least on part of the content within the control message 1004.

As is known, if the user were to continue typing in the query term 302, the specific ones within the one or more suggests can be updated by means of exchanging one or more control messages similar to the control message 1002 and the control message 1004.

Upon the user pressing an ENTER button or selecting one of the one or more suggests 306, the search application 104 transmits a control message 1006 to the server 116, the control message 1006 containing the query term 302 (or the completed query term with one of the suggests from one or more suggests 306).

In response to the receipt of the query term 302, the server 116 executes a search, using one or more techniques described herein above and generates a ranked search results list. The server 116 then generates a control message 1008 and transmits the control message 1008 to the first electronic device 102. The control message 1008 contains information representative of the ranked search results list, the control message 1008 being instrumental in causing the search results interface 108 to display a SERP.

Figure 4:
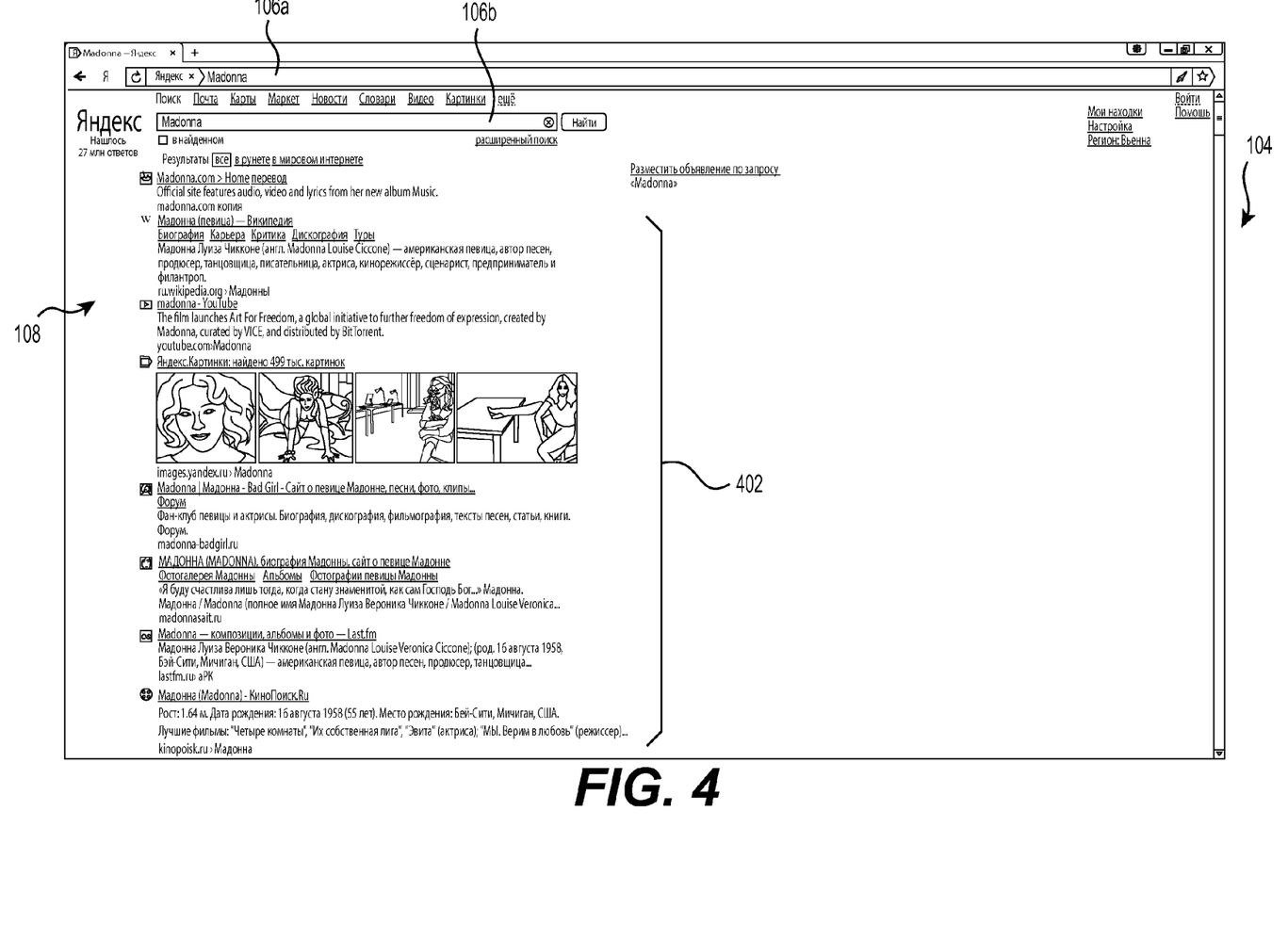
FIG. 4 depicts a non-limiting embodiment of the search application 104 of FIG. 3 displaying a SERP in response to the user entering a search query or selecting one of the suggests presented within the depiction of FIG. 3.

With reference to FIG. 4, there is depicted the search application 104 after receipt of the command message 1008. More specifically, within the depiction of FIG. 4, the query interface 106 has been effectively split into two parts—a browser command line 106a and the search engine query interface 106b. The search results interface 108 has been populated with a SERP 402, the SERP 402 having been generated at least in part on the information contained in the command message 1008.

It shall be assumed that, upon browsing the information presented within the SERP 402, the user has decided to select the second search result within the SERP 402, the second search result being associated with the Russian Wikipedia article on Madonna (Singer). Upon the user clicking (or otherwise selecting) the second search result, the search application 104 transmits a command message 1010 to the server 116, the command message 1010 being indicative of the user selection of one of the results (namely the second result) within the SERP 402.

Upon receipt of the command message 1010, the server 116 fetches content of the resource associated with the second search result within SERP 402 and generates a command message 1012, the command message 1012 having information associated with a page associated with the resource associated with the second search result within the SERP 402. Alternatively, the command message 1012 can be exchanged directly with a web server (not depicted) hosting a web resource associated with the selected search result.

Figure 5:
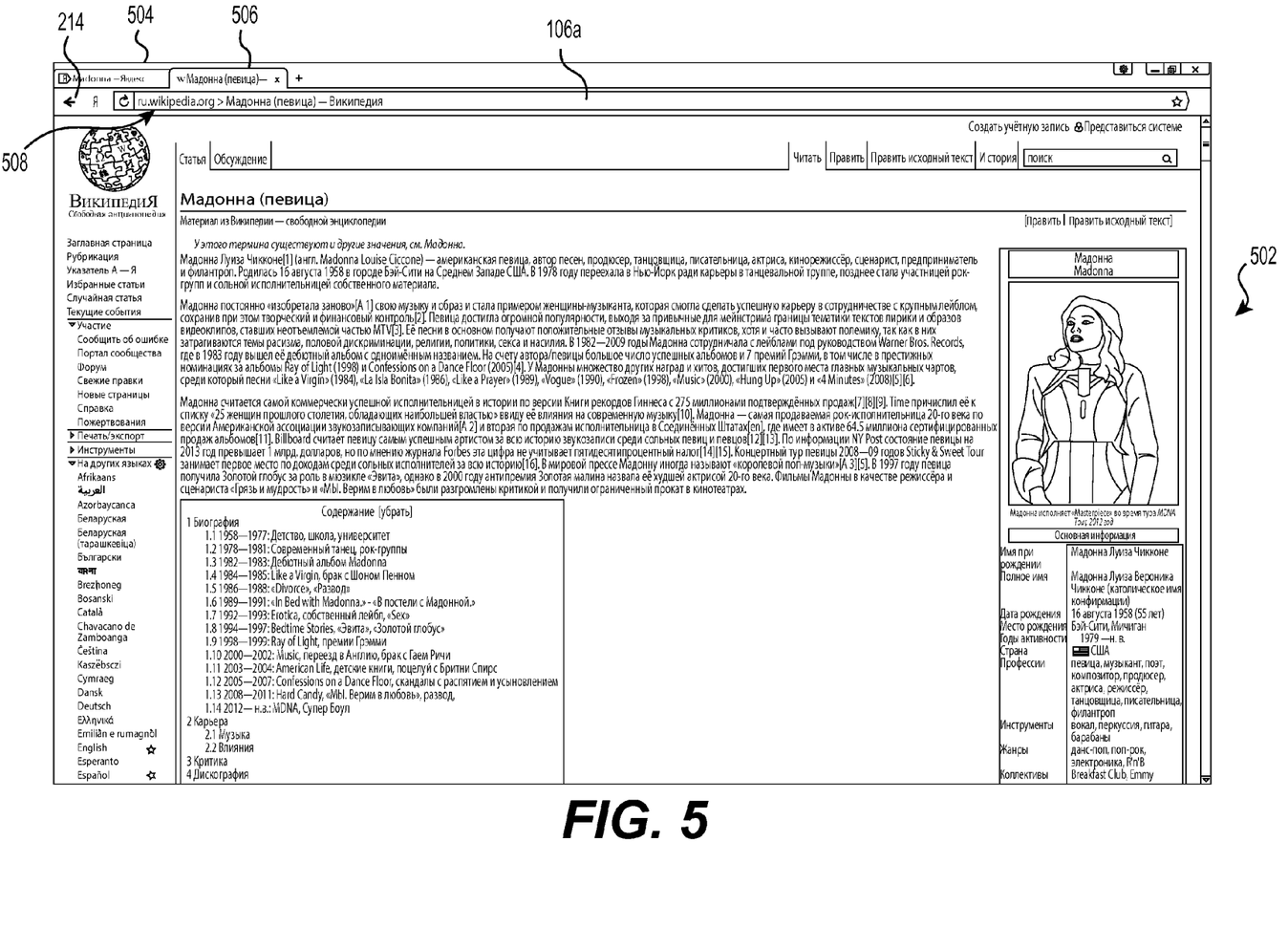
FIG. 5 depicts a non-limiting embodiment of a web resource page associated with a resource associated with a selected search result within the SERP of FIG. 4.

The first electronic device 102 receives the command message 1012 and presents to the user a web resource, a non-limiting embodiment of which is depicted in FIG. 5 at a screen shot 502. The screen shot 502 is a representation of the Russian Wikipedia page Madonna (Singer), which page is associated with the second search result within the SERP 402.

It is noted that within the depiction of FIG. 5, the search application 104 displays the SERP 402 in a second tab 506, different from a first tab 504 (where the search application 104 of FIG. 4 is still displayed). In alternative embodiments, instead of using separate tabs 504, 506, separate windows can be utilized.

It is also noted that within the browser command line 106a, a browser path 508 is displayed, the browser path 508 including information about the web page being displayed, as well as the root resource information (which in this case is ru.wikipedia.org).

Now, let it be assumed that the user is browsing the web page displayed in FIG. 5 and comes upon a link of interest and is desirous of obtaining additional information associated therewith. For example, within the Russian Wikipedia article about Madonna (Singer), there is a link to the MTV station. The user may be desirous of reading more information about the MTV station and, as such, clicks (or otherwise activates) the link to MTV.

Upon the user clicking (or otherwise selecting) the hyperlink associated with MTV, the search application 104 transmits a command message 1014 to the server 116, the command message 1014 being indicative of the user selection of the hyperlink associated with the MTV web resource within the Russian Wikipedia service. Alternatively, the command message 1014 can be exchanged directly with a web server (not depicted) hosting a web resource associated with the MTV web resource.

Upon receipt of the command message 1014, the server 116 fetches content of the resource associated with the MTV web resource within the Russian Wikipedia service and generates a command message 1016, the command message 1016 having information associated with the MTV web resource within the Russian Wikipedia service.

Figure 6:
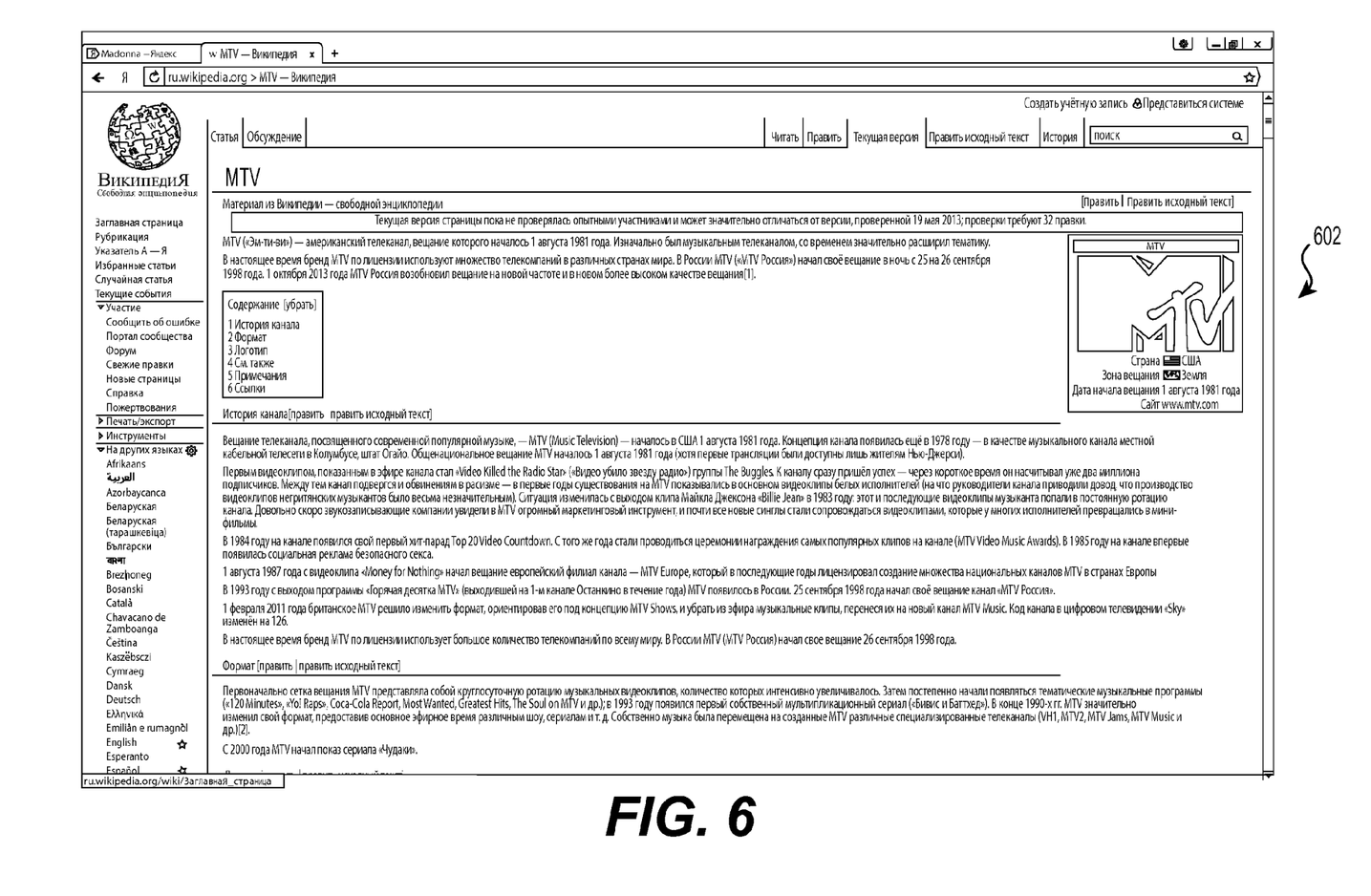
FIG. 6 depicts a non-limiting embodiment of a web resource page presented to the user responsive to the user interaction with the web resource page of FIG. 5.

The first electronic device 102 receives the command message 1016 and presents to the user an information page, a non-limiting embodiment of which is depicted in FIG. 6 at a screen shot 602. The screen shot 602 is a representation of the Russian Wikipedia page about MTV, which page is associated with the hyperlink selected by the user within the illustration of FIG. 5.

Now, let it be assumed that the user wishes to go back to the Russian Wikipedia page Madonna (Singer), which page is depicted within the screenshot 502 of FIG. 5. Recalling that the search application includes the back button 214, the user may actuate the back button 214 indicative of her desire to return to the previous page.

Within some embodiments of the present technology, the search application 104 may respond to the user actuating the back button 214 by presenting to the user the page shown in screen shot 502, the page having been stored in the cache memory of the first electronic device 102. Within these embodiments, the search application 104 may generate a control message 1018, the control message 1018 indicative of the user's command to return to the pervious page. The search application 104 then transmits the control message 1018 to the server 116.

Within other embodiments of the present technology (for example, where cache storage of pages has been disabled due, for example, for a privacy browsing settings), the search application 104 may respond to the user actuating the back button 214 by generating the control message 1018, the control message 1018 indicative of the user's command to return to the pervious page. The search application 104 then transmits the control message 1018 to the server 116.

Upon receipt of the command message 1018, the server 116 fetches content of the resource associated with the Russian Wikipedia page abut Madonna (Singer) and generates a command message similar to the command message 1012, the command message 1012 having information associated with a page associated with the resource associated with the Russian Wikipedia page abut Madonna (Singer).

According to embodiments of the present technology, the server-session-storage module 160 is configured to keep track of various control messages exchanged between the first electronic device 102 and the server 116. More specifically, the server-session-storage module 160 is configured to appreciate and to store an indication of one or more of the control message 1002, the control message 1004, the control message 1006, the control message 1008, the control message 1010, the control message 1012, the control message 1014, the control message 1016 and the control message 1018.

By appreciating and storing the indication of one or more of the control message 1002, the control message 1004, the control message 1006, the control message 1008, the control message 1010, the control message 1012, the control message 1014, the control message 1016 and the control message 1018, the server-session-storage module 160 can be said to appreciate the server-side history associated with the interaction between the search application 104 and the server 116.

Put another way, by appreciating and storing the indication of one or more of the control message 1002, the control message 1004, the control message 1006, the control message 1008, the control message 1010, the control message 1012, the control message 1014, the control message 1016 and the control message 1018, the server-session-storage module 160 can be said to appreciate the server-side history associated with a browsing session between the search application 104 and the server 116. In this specific example, the server-side history associated with the browsing session between the search application 104 and the server 116 include:

User interaction with the search application 104 as part of providing the search query 302;

User interaction with the search application 104 for the user to select one of the one or more suggests 306;

User interaction with the search application 104 for the user to select one or more search results within the SERP 402;

User interaction with the search application 104 for the user to navigate back and forth between the various resources, such as the above-described example with the user actuating the back button 214 to return from the resource about MTV to the resource about Madonna.

Therefore, it can be said that the "server-side history" includes a comprehensive indication of user interactions within the browsing session executed on the first electronic device 102. Some of these interactions are not necessarily "visible" to the search application 104 in a sense that they would not be stored within the browsing history of the search application 104. For example, the fact that the user has selected the second search result from the SERP 402 would not be "visible" to the search application 104 without access to the server-side history.

In some embodiments of the present technology, the server-session-storage module 160 stores an indication of the server-side history in a memory storage (not depicted) in association with the user of the first electronic device 102. In some embodiments of the present technology this association with a user is implemented as a user logging in or otherwise authenticating herself in a service.

In a specific example, the user may have authenticating herself with the Yandex search engine by logging in with her Yandex Passport. In alternative embodiments, the user may have authenticated herself into another service. In yet other examples, the user may not have to log in into any particular services, but rather user credential for logging into a computer network or a corporate network may be used.

In some embodiments of the present technology, the storage of the server-side history is executed by the server-sessions-storage module 160 in response to the user activating the server-synchronization function. In some embodiments, the activation of the server-synchronization function is executed by means of the user actuating (or not) the synchronization control button 218. Alternatively, the user can activate the server-synchronization function in a setting tab of a browser (such as the search application 104).

The user of the first electronic device 102 can turn the server-side history synchronization on and off using the synchronization control button 218. The indication of the user activation (or di-activation) of the server-synchronization function can also be stored by the server-sessions-storage module 160. For example, the server-sessions-storage module 160 can activate a flag (or any other indication) in association with the user profile stored in the memory of the server-sessions-storage module 160.

In some embodiments of the present technology, the server-session-storage module 160 stores the indication of the server-side history in the memory storage (not depicted) for a period of time. In some embodiments of the present technology, the period of time can be pre-set. As an example, the pre-set period of time can be 30 minutes, 2 hours, 1 day, 2 weeks, 6 months or the like. Alternatively, the pre-set period of time can be pre-set by the user of the first electronic device 102. In other embodiments of the present technology, the period of time can be until an expiry or occurrence of a particular event. For example, the server-session-storage module 160 stores the indication of the server-side history in the memory storage (not depicted) until the user logs off or, otherwise, turns off the server-side synchronization function.

Now consider where the user now chooses to use the second electronic device 103 to access the search application 104, which search application 104 is also available on the second electronic device 103. In other words, the user establishes a second browsing session using the second electronic device 103, the second browsing session being established at a point of time after the user conducted the first browsing session using the first electronic device 102.

Recalling that the user has activated the server-synchronization function and assuming that the user is also logged into the service on the second electronic device 103, the second electronic device 103 accesses the server-sessions-storage module 160 to retrieve server-side history of the user interaction in the browsing session on the first electronic device 102.

By accessing the server-sessions-storage module 160, the second electronic device 103 becomes aware of the interactions of the user within the browsing session on the first electronic device 102:

User interaction with the search application 104 as part of providing the search query 302;

User interaction with the search application 104 for the user to select one of the one or more suggests 306;

User interaction with the search application 104 for the user to select one or more search results within the SERP 402;

User interaction with the search application 104 for the user to navigate back and forth between the various resources, such as the above-described example with the user actuating the back button 214 to return from the resource about MTV to the resource about Madonna.

In other words, the user can in a sense continue the browsing session from the first electronic device 102 using the second electronic device 103. It is noted that by accessing the server-side history available on the server-sessions-storage module 160, the second electronic device 103 becomes aware of the complete history of user interaction within the browsing session on the first electronic device 102. For example, by appreciating the server-side history, the second electronic device 103 appreciates not only which search the user conducted, but also which search results the user selected and the browsing history back and forth between the various resources.

Now, even though the above has been described using the example of the user first using the first electronic device 102 to perform a first browsing session and then using the second electronic device 103 to conduct the second browsing session, the second browsing session being presented with the server-side history, it is also possible that the user conducts the second browsing session using the first electronic device 102 at a point of time after she has conducted the first browsing session using the first electronic device 102.

This is particularly useful, but not limited to, where the privacy browsing has been enabled on the first electronic device 102. As such, whether the user employs the first electronic device 102 or the second electronic device 103 (or any other electronic device potentially associated with the user), the user can have access to the server-side history. Hence, irrespective of which device the user uses (the first electronic device 102, the second electronic device 103 or any other electronic device potentially associated with the user), the user can have a seemless browsing experience with the server-side history associated with the first browsing session being available on any electronic device the user chooses to employ for the second browsing session (the first electronic device 102, the second electronic device 103 or any other electronic device potentially associated with the user).

It should be noted that in addition to the interception and storing the various control messages described above, the server-sessions-storage module 160 can also store an indication of bookmarks and search history locally saved on the first electronic device 102. As such, embodiments of the present technology, enable the second browsing session to have both server-side history and browser-side history available during the second browsing session on any electronic device the user chooses to employ for the second browsing session (the first electronic device 102, the second electronic device 103 or any other electronic device potentially associated with the user).

Given the architecture described above, it is possible to execute a method of synchronizing a first browsing session and a second browsing session for a user. The method of synchronizing the first browsing session and the second browsing session for the user can be conveniently executed on the server-sessions-storage module 160. Alternatively, where the server 116 incorporates the functionality of the server-sessions-storage module 160, the method can be executed on the server 116. To that end, the server-sessions-storage module 160 (or the server 116) includes computer usable information storage medium storing computer instructions, which instructions when executed, cause the server-sessions-storage module 160 (or the server 116) to execute steps of the method described herein below.

For the purposes of the description below, it shall be assumed that the first browsing session has been executed on the first electronic device 102 and that the server-sessions-storage module 160 has appreciated and stored the server-side history as has been described above. It shall be also assumed that the user is desirous of using the second electronic device 103 to continue the browsing session previously executed at the first electronic device 102 or that the user is desirous of using the first electronic device 102 to continue the browsing session at a point of time after she has completed the first browsing session. It shall also be assumed that that the user has activated the server-side synchronization function.

Figure 7:
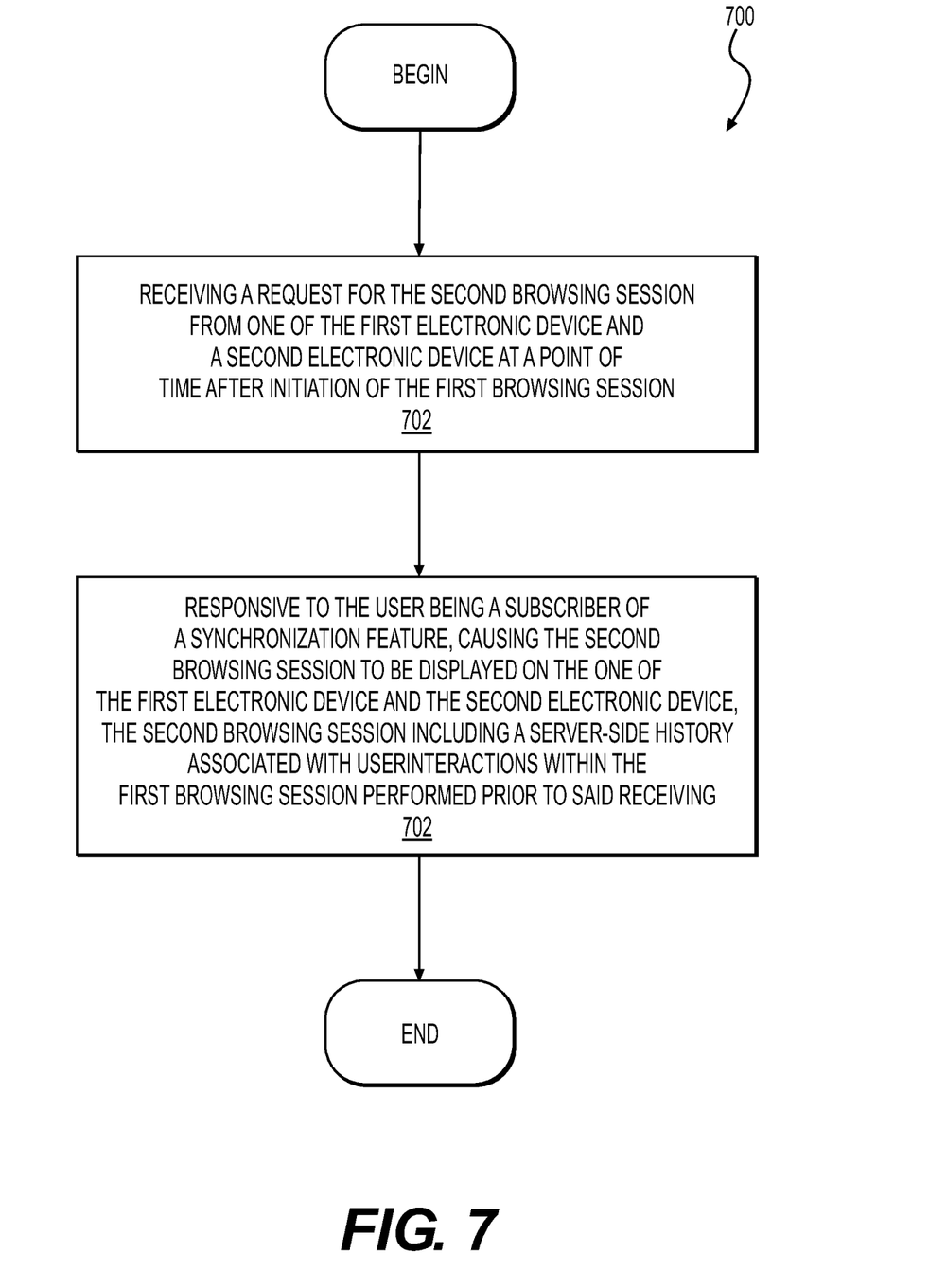
FIG. 7 depicts a block diagram of a method 700 executed within the system 100 of FIG. 1, the method being implemented in accordance with a non-limiting embodiment of the present technology.

With reference to FIG. 7, there is depicted a flow chart depicting the steps of method 700, the method 700 being implemented in accordance to a non-limiting embodiment of the present technology.

Step 702—receiving a request for the second browsing session from one of the first electronic device and a second electronic device at a point of time after initiation of the first browsing session The method 700 begins at step 702, where the server-sessions-storage module 160 receives a request for the second browsing session from one of the first electronic device 102 and the second electronic device 103 at a point of time after initiation of the first browsing session.

As has been alluded to above, the user can initiate the second browsing session using one of the first electronic device 102 and the second electronic device 103. The second browsing session is executed by means of the user starting the search application 104 on the respective one of the first electronic device 102 and the second electronic device 103.

Upon the user launching the search application 104 (or otherwise indicating her desire to start the second browsing session), a command signal can be sent to the server-sessions-storage module 160 (or the server 116).

The method 700 then proceeds to step 704.

Step 704—responsive to the user being a subscriber of a synchronization feature, causing the second browsing session to be displayed on the one of the first electronic device and the second electronic device, the second browsing session including a server-side history associated with user interactions within the first browsing session performed prior to said receiving Next, at step 704, responsive to the user being a subscriber of a synchronization feature, the server-sessions-storage module 160 causes the second browsing session to be displayed on the one of the first electronic device 102 and the second electronic device 103 (depending on which one requested the second browsing session at step 702), the second browsing session including a server-side history associated with user interactions within the first browsing session performed prior to the receiving of the request for the second browsing session in step 702.

First, the server-sessions-storage module 160 (or the server 116) determines if the user has activated the synchronization feature. Responsive to the user having activated the synchronization feature, the server-sessions-storage module 160 retrieves the server-side history that has been appreciated and stored in association with the first browsing session. The server-sessions-storage module 160 then makes this server-side history available on the one of the first electronic device 102 or the second electronic device 103 (depending which one of them has requested the second browsing session as part of step 702).

Hence, by executing step 704, the one of the first electronic device 102 or the second electronic device 103 (depending which one of them has requested the second browsing session as part of step 702) becomes aware of the server-side history that was executed during the first browsing session on the first electronic device 102.

The method 700 then terminates. Naturally, the second browsing session can in itself be the first browsing session in a sense that the server-sessions-storage module 160 can appreciate and store an indication of the user interactions within the second browsing session for it to become available on any other electronic device to be used for conducting future browsing sessions.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of synchronizing a first browsing session and a second browsing session for a user, the first browsing session having been executed on a first electronic device, the first browsing session being a search engine session, the method comprising:
   receiving, by a server via a communication network, a request for the second browsing session, the second browsing session being the search engine session, from one of the first electronic device and a second electronic device at a point of time after initiation of the first browsing session; the first electronic device and the second electronic device being a subset of a set of electronic devices associated with the user;
   tracking, by the server, server processing of the user interactions with the search engine session to create, based on the server processing of the user interactions, a server-side history including at least one indication of server processing of the user interaction with the search engine session, the at least one indication of server processing of the user interaction with the search engine session not being visible from a browsing history stored on any one of the set of electronic devices, the at least one indication of server processing of the user interaction with the search engine session not being visible from the browsing history by virtue of it never having been stored in the browsing history of any one of the set of electronic devices;

responsive to the user being a subscriber of a synchronization feature, causing by the server via the communication network the second browsing session to be displayed on the one of the first electronic device and the second electronic device, the second browsing session including information from the browsing history of the first electronic device and the server-side history associated with the at least one indication of server processing of the user interactions within the first browsing session performed prior to said receiving, the server-side history including the at least one indication of server processing of the user interaction with the search engine session.

2. The method of claim 1, wherein the first electronic device and the second electronic device are the same electronic device.

3. The method of claim 1, wherein said server-side history includes searches executed by the user within the first browsing session and wherein the at least one user interaction includes at least selecting a particular vertical search result.

4. The method of claim 1, wherein said server-side history includes an indication of which search results within the search engine search session were selected by the user within the first browsing session.

5. The method of claim 1, further comprising retrieving the server-side history associated with the user interactions within the first browsing session.

6. The method of claim 1, further comprising, during said first browsing session, acquiring and storing the indication of server processing of the user interactions within the first browsing session in a memory.

7. The method of claim 6, wherein said acquiring comprises intercepting control messages exchanged between the first electronic device and the server.

8. The method of claim 6, wherein said storing comprises storing the indication of the user interactions in the memory in association with a user profile associated with the user.

9. The method of claim 8, further comprising retaining the indication of the user interactions in the memory for a period of time.

10. The method of claim 1 further comprising checking if the user is a subscriber to the synchronization function.

11. The method of claim 10, wherein said checking comprises accessing a memory and determining if a flag indicative of the user being the subscriber has been stored.

12. A server comprising a communication interface structured and configured to communicate with a communications network and at least one computer processor operationally connected with the communication interface and structured and configured to:
receive, via the communication interface, a request for a second browsing session from one of a first electronic device and a second electronic device at a point of time after initiation of a first browsing session, the first browsing session having been executed on the first electronic device, the first browsing session being a search engine session and the second browsing session being the search engine session; the first electronic device and the second electronic device being a subset of a set of electronic devices associated with the user;
track processing, by the server, of the user interactions with the search engine session to create, based on the server processing of the user interactions, a server-side history including at least one indication of server processing of the user interaction with the search engine session, the at least one indication of server processing of the user interaction with the search engine session not being visible from a browsing history stored on any one of the set of electronic devices, the at least one indication of server processing of the user interaction with the search engine session not being visible from the browsing history by virtue of it never having been stored in the browsing history of any one of the set of electronic devices;
responsive to the user being a subscriber of a synchronization feature, cause, via the communication interface, the second browsing session to be displayed on the one of the first electronic device and the second electronic device, the second browsing session including information from the browsing history of the first electronic device and the server-side history associated with the at least one indication of server processing of the user interactions within the first browsing session performed prior to said receiving, the server-side history including the at least one indication of server processing of the user interaction with the search engine session.

13. The server of claim 12, wherein the first electronic device and the second electronic device are the same electronic device.

14. The server of claim 12, wherein said server-side history includes searches executed by the user within the first browsing session and wherein the at least one user interaction includes at least selecting a particular vertical search result.

15. The server of claim 12, wherein said server-side history includes an indication of which search results within the search engine search session were selected by the user within the first browsing session.

16. The server of claim 12, wherein the server is further configured to retrieve the server-side history associated with the indication of server processing of the user interactions within the first browsing session.

17. The server of claim 12, wherein the server is further configured during said first browsing session, to acquire and store an indication of the user interactions within the first browsing session in a memory.

18. The server of claim 12, wherein the server is further configured, to acquire the servers-side history, to intercept control messages exchanged between the first electronic device and the server.

19. The server of claim 12, wherein the server is further configured, to store the indication of the server processing of the user interactions, to store the indication of the user interactions in the memory in association with a user profile associated with the user.

20. The server of claim 12, wherein the server is further configured to retain the indication of the server processing of the user interactions in the memory for a period of time.

21. The server of claim 12, wherein the server is further configured to check if the user is a subscriber to the synchronization function.

22. The server of claim 21, wherein the server is further configured, to check if the user is a subscriber, to access a memory and determining if a flag indicative of the user being the subscriber has been stored.

23. The server of claim 12, the server being implemented as a search engine server.

24. The server of claim 12, the server being implemented as a server-session-storage module being in communication with a search engine server via the communication interface.

* * * * *